United States Patent
Binion et al.

(10) Patent No.: US 11,068,989 B2
(45) Date of Patent: Jul. 20, 2021

(54) ADJUSTING INSURANCE POLICIES BASED ON COMMON DRIVING ROUTES AND OTHER RISK FACTORS

(71) Applicant: STATE FARM MUTUAL AUTOMOBILE INSURANCE COMPANY, Bloomington, IL (US)

(72) Inventors: Todd Binion, Bloomington, IL (US); Steven Cielocha, Bloomington, IL (US); Scott Thomas Christensen, Bloomington, IL (US); Gregory Hayward, Bloomington, IL (US); Christopher E. Gay, Dallas, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 499 days.

(21) Appl. No.: 14/203,143

(22) Filed: Mar. 10, 2014

(65) Prior Publication Data
US 2014/0257869 A1 Sep. 11, 2014

Related U.S. Application Data

(60) Provisional application No. 61/775,652, filed on Mar. 10, 2013.

(51) Int. Cl.
*G06Q 40/08* (2012.01)
*B60Q 1/00* (2006.01)
(Continued)

(52) U.S. Cl.
CPC .............. *G06Q 40/08* (2013.01); *B60C 1/00* (2013.01); *B60Q 1/00* (2013.01); *B60R 25/20* (2013.01);
(Continued)

(58) Field of Classification Search
CPC .... G06Q 40/08; G06Q 10/0631; G06Q 40/02; G06Q 30/0261; G06Q 30/0265;
(Continued)

(56) References Cited

U.S. PATENT DOCUMENTS

| | | |
|---|---|---|
| 5,499,182 A | 3/1996 | Ousborne |
| 5,797,134 A | 8/1998 | McMillan et al. |

(Continued)

FOREIGN PATENT DOCUMENTS

WO WO-2008125376 A1 * 10/2008 ....... G08G 1/096838

OTHER PUBLICATIONS

Bogdan: Color Adjustments: Brightness, Contrast, and Gamma, Apr. 9, 2012, pp. 1-3 (Year: 2012).*

(Continued)

*Primary Examiner* — Bijendra K Shrestha
(74) *Attorney, Agent, or Firm* — Marshall, Gerstein & Borun LLP

(57) ABSTRACT

A computer implemented method for providing insurance comprises receiving a plurality of vehicle data including a start point, an end point and a frequency value. The method further comprises analyzing the plurality of vehicle data to determine a driving route associated with the vehicle. The method also comprises determining, based on the frequency value, that the driving route is a common driving route and a risk level of the common driving route. The method further comprises processing one or more insurance options, including pricing and underwriting, based at least in part on the risk level of the common driving route.

6 Claims, 6 Drawing Sheets

(51) Int. Cl.
| | |
|---|---|
| *G06Q 40/00* | (2012.01) |
| *B60R 25/20* | (2013.01) |
| *G07C 5/00* | (2006.01) |
| *H04W 4/40* | (2018.01) |
| *G08G 1/0968* | (2006.01) |
| *G06Q 10/06* | (2012.01) |
| *G06Q 30/02* | (2012.01) |
| *B60C 1/00* | (2006.01) |

(52) U.S. Cl.
CPC ..... *G06Q 10/0635* (2013.01); *G06Q 30/0207* (2013.01); *G06Q 30/0208* (2013.01); *G06Q 40/00* (2013.01); *G07C 5/00* (2013.01); *G07C 5/008* (2013.01); *G08G 1/096838* (2013.01); *H04W 4/40* (2018.02)

(58) Field of Classification Search
CPC .... G06Q 50/30; G06Q 40/00; G06Q 10/0635; G06Q 20/22; G06Q 40/025; G06Q 30/0207; G06Q 30/0208; G01C 21/00; G01C 21/34; G06C 40/08; G07C 5/008; G07C 5/00; B60C 1/00; B60Q 1/00; B60R 25/20; H04W 4/40; G08G 1/096838
USPC .... 705/4; 701/410, 411, 521, 533, 538, 414, 701/424
See application file for complete search history.

(56) References Cited

U.S. PATENT DOCUMENTS

| | | | |
|---|---|---|---|
| 6,064,970 A | 5/2000 | McMillan et al. | |
| 6,868,386 B1 | 3/2005 | Henderson et al. | |
| 7,343,306 B1* | 3/2008 | Bates | G06Q 40/08 701/32.4 |
| 7,343,310 B1* | 3/2008 | Stender | G06Q 10/10 705/2 |
| 8,140,358 B1 | 3/2012 | Ling et al. | |
| 8,332,242 B1* | 12/2012 | Medina, III | G06Q 40/08 705/4 |
| 8,489,433 B2* | 7/2013 | Altieri | G06Q 40/08 705/4 |
| 8,508,353 B2 | 8/2013 | Cook et al. | |
| 8,566,126 B1* | 10/2013 | Hopkins, III | G06F 17/40 340/439 |
| 8,606,512 B1* | 12/2013 | Bogovich | G01C 21/3415 701/423 |
| 8,606,514 B2* | 12/2013 | Rowley | G08G 1/096888 701/424 |
| 8,612,139 B2* | 12/2013 | Wang | G08G 1/096775 701/410 |
| 8,630,768 B2 | 1/2014 | McClellan et al. | |
| 8,682,699 B2* | 3/2014 | Collins | G06Q 40/08 705/4 |
| 8,725,408 B2* | 5/2014 | Hochkirchen et al. | 701/410 |
| 9,141,995 B1* | 9/2015 | Brinkmann | G07C 5/02 |
| 2002/0111725 A1 | 8/2002 | Burge | |
| 2003/0191581 A1* | 10/2003 | Ukai | G08G 1/20 705/4 |
| 2004/0153362 A1 | 8/2004 | Bauer et al. | |
| 2006/0049925 A1* | 3/2006 | Hara | B60R 25/04 340/435 |
| 2006/0247852 A1* | 11/2006 | Kortge | G01C 22/00 701/533 |
| 2007/0226014 A1* | 9/2007 | Alemayehu | G06Q 40/06 705/4 |
| 2008/0294690 A1* | 11/2008 | McClellan | G08G 1/096725 |
| 2009/0024419 A1 | 1/2009 | McClellan et al. | |
| 2010/0066513 A1 | 3/2010 | Bauchot et al. | |
| 2010/0131304 A1 | 5/2010 | Collopy et al. | |
| 2010/0238009 A1* | 9/2010 | Cook | G06Q 10/06393 340/439 |
| 2011/0112717 A1* | 5/2011 | Resner | G07C 5/085 701/31.4 |
| 2011/0153367 A1 | 6/2011 | Amigo et al. | |
| 2011/0213628 A1* | 9/2011 | Peak | G06Q 40/08 705/4 |
| 2011/0307188 A1* | 12/2011 | Peng | G01B 11/00 702/33 |
| 2012/0004933 A1 | 1/2012 | Foladare et al. | |
| 2012/0109418 A1 | 5/2012 | Lorber | |
| 2012/0109692 A1 | 5/2012 | Collins et al. | |
| 2012/0158436 A1 | 6/2012 | Bauer et al. | |
| 2012/0197669 A1 | 8/2012 | Kote et al. | |
| 2012/0209632 A1 | 8/2012 | Kaminski et al. | |
| 2012/0209634 A1 | 8/2012 | Ling et al. | |
| 2012/0214472 A1 | 8/2012 | Tadayon et al. | |
| 2013/0013347 A1 | 1/2013 | Ling et al. | |
| 2013/0013348 A1 | 1/2013 | Ling et al. | |
| 2013/0046559 A1* | 2/2013 | Coleman | G06Q 40/08 705/4 |
| 2013/0110310 A1 | 5/2013 | Young | |
| 2013/0166326 A1 | 6/2013 | Lavie et al. | |
| 2013/0289819 A1 | 10/2013 | Hassib et al. | |
| 2013/0304515 A1* | 11/2013 | Gryan et al. | 705/4 |
| 2014/0074402 A1* | 3/2014 | Hassib | G01C 21/3461 701/533 |
| 2014/0108058 A1* | 4/2014 | Bourne | G06Q 40/08 705/4 |
| 2014/0180723 A1* | 6/2014 | Cote | G06Q 40/08 705/4 |
| 2014/0257863 A1* | 9/2014 | Maastricht | G06Q 40/08 705/4 |
| 2014/0304011 A1* | 10/2014 | Yager | G06Q 40/08 705/4 |

OTHER PUBLICATIONS

Falk, T.: Ice Sensors in Cars Warns of Slippery Roads, Jan. 25, 2013, pp. 1-4 (Year: 2013).*

Kathleen et al.: Route Preferences and the Value of Travel-Time Information for Motorists Driving Real-World Routes, May 2005, Minnesota Dept. of Transportation, pp. 1-62. (Year: 2005).*

* cited by examiner

ADJUSTING INSURANCE POLICIES BASED ON COMMON DRIVING ROUTES AND OTHER RISK FACTORS

CROSS-REFERENCE TO RELATED APPLICATIONS

This application claims the benefit of U.S. Provisional Application No. 61/775,652, filed Mar. 10, 2013, which is incorporated by reference herein.

FIELD OF THE DISCLOSURE

This disclosure generally relates to insurance premiums and, more particularly, to establishing and using common driving routes for assessing, pricing and provisioning of vehicle insurance.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Insurance companies desire to collect vehicle and driver behavior data for use in enhancing policy holder risk assessment. Many companies employ vehicle monitoring system for a variety of purposes, including determining of insurance risk and/or premiums. These systems may monitor many vehicle attributes, such as location, speed, acceleration/deceleration, etc. The monitoring devices are integrated with the vehicle or plugged into the vehicle systems. Many of these monitoring systems require expert installation into the vehicle and further require the user to periodically withdraw the monitoring device to download the trip data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, a computer implemented method for providing insurance comprises receiving, via a computer network, a plurality of vehicle data, wherein the plurality of vehicle data includes, for a trip of the vehicle, at least a start point, an end point and a frequency value and analyzing, at one or more processors, the plurality of vehicle data to determine a driving route associated with the vehicle including the start point and the end point. The method also includes determining, at the one or more processors, based on the frequency value, that the driving route is a common driving route and determining, at the one or more processors, a risk level of the common driving route. The method further includes processing, at the one or more processors, one or more insurance options, including pricing and underwriting, based at least in part on the risk level of the common driving route.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
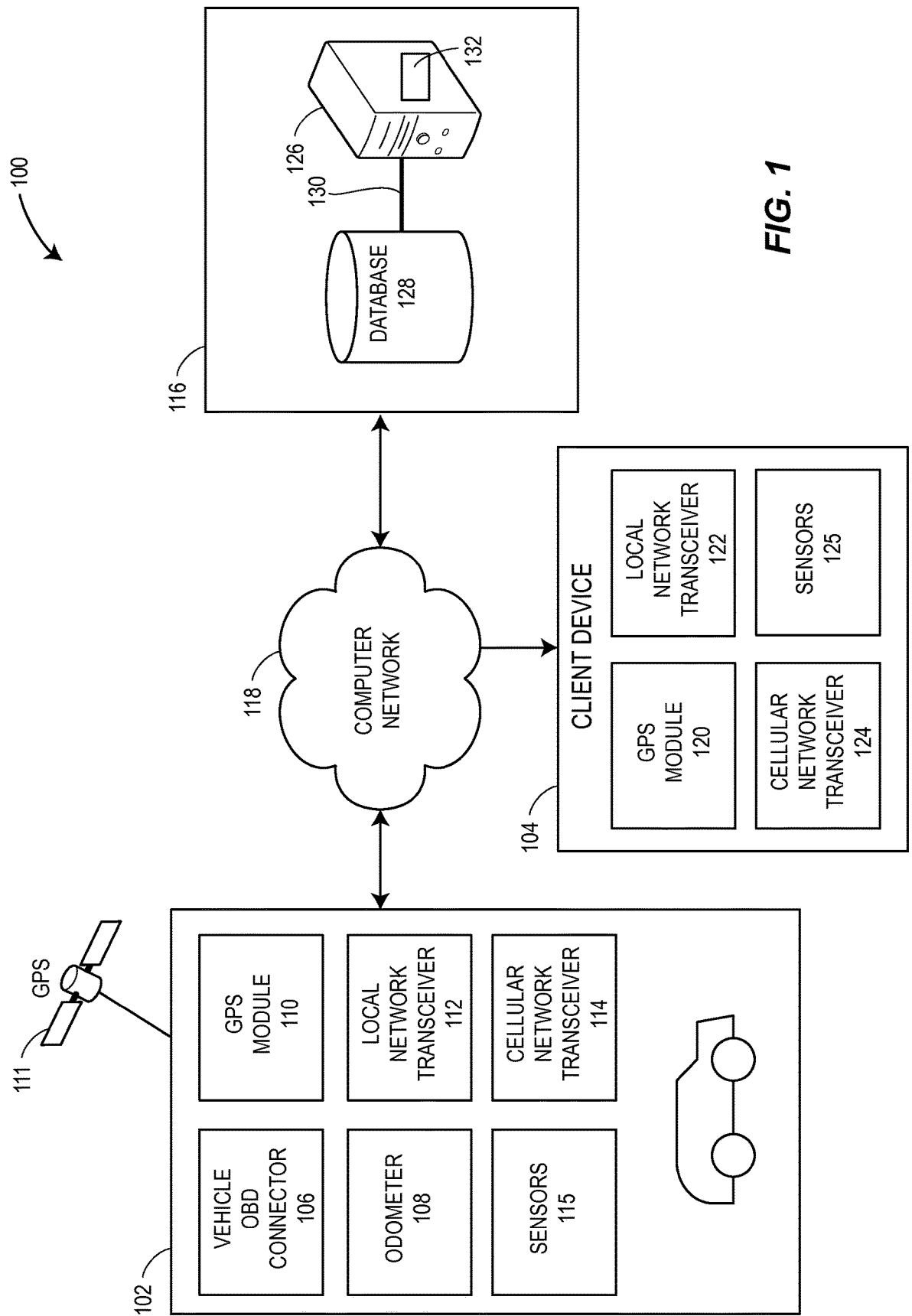
FIG. 1 is a block diagram of an example computing system in which the techniques for adjusting insurance policies based on common driving routes and other risk factors can be implemented.

FIG. 1 illustrates various aspects of an exemplary architecture implementing a system 100 for adjusting insurance policies based on common driving routes and other risk factors. The high-level architecture includes both hardware and software applications, as well as various data communications channels for communicating data between the various hardware and software components. The system 100 for adjusting insurance policies based on common driving routes and other risk factors may include various software and hardware components or modules.

The system 100 for adjusting insurance policies based on common driving routes and other risk factors may include front end components, including a vehicle 102 and a client device 104. The vehicle may include an on board diagnostics connector 106, an odometer 108 and a GPS 110 module for communicating with one or more GPS satellites 111. The vehicle 102 may also include a local network transceiver 112 and/or a cellular network transceiver 114 for communicating with backend components 116 via the computer network 118.

The computer network 118 may be a network such as the Internet or other type of suitable network (e.g., local area network (LAN), a metropolitan area network (MAN), a wide area network (WAN), a mobile, a wired or wireless network, a private network, a virtual private network, etc.). The computer network 118 may also be one or more cellular networks such as code division multiple access (CDMA) network, GSM (Global System for Mobile Communications) network, WiMAX (Worldwide Interoperability for Microwave Access) network, Long Term Evolution (LTE) network, etc.

In some embodiments, the client device 104 may be placed in the vehicle 102. The client device 104 may be a personal computer, a smart phone, a tablet computer, a smart watch, a head mounted display, a wearable computer or other suitable client device. In some embodiments, the client device 104 may also include a GPS module 120 for communicating with the one or more GPS satellites 111. The client device 104 may also include a local network transceiver 122 and/or a cellular network transceiver 124 for communicating with the backend components 116 via the computer network 118. In an embodiment, the client device 102 may also execute one or more applications to allow a customer to manage a customer account, purchase one or more insurance products, view driving statistics, change settings, etc. In some embodiments, both the vehicle 102 and the client device 104 may include additional sensors.

The back end components 116 may include a data server 126 and a database 128. The back end components may communicate with each other through a communication network 130 such as a local area network or other type of suitable network (e.g., the Internet, a metropolitan area network (MAN), a wide area network (WAN), a mobile, a wired or wireless network, a private network, a virtual private network, etc.).

In some embodiments, the system 100 for adjusting insurance policies based on common driving routes and other risk factors in general and the data server 126 in particular may include computer-executable instructions 132. A processor of the data server 126 may execute the instructions 132 to instantiate one or more modules for retrieving and analyzing data from one or more databases 128, as discussed in further detail below. The database 128 may be a data storage device such as random-access memory (RAM), hard disk drive (HDD), flash memory, flash memory such as a solid state drive (SSD), etc.

Figure 2:
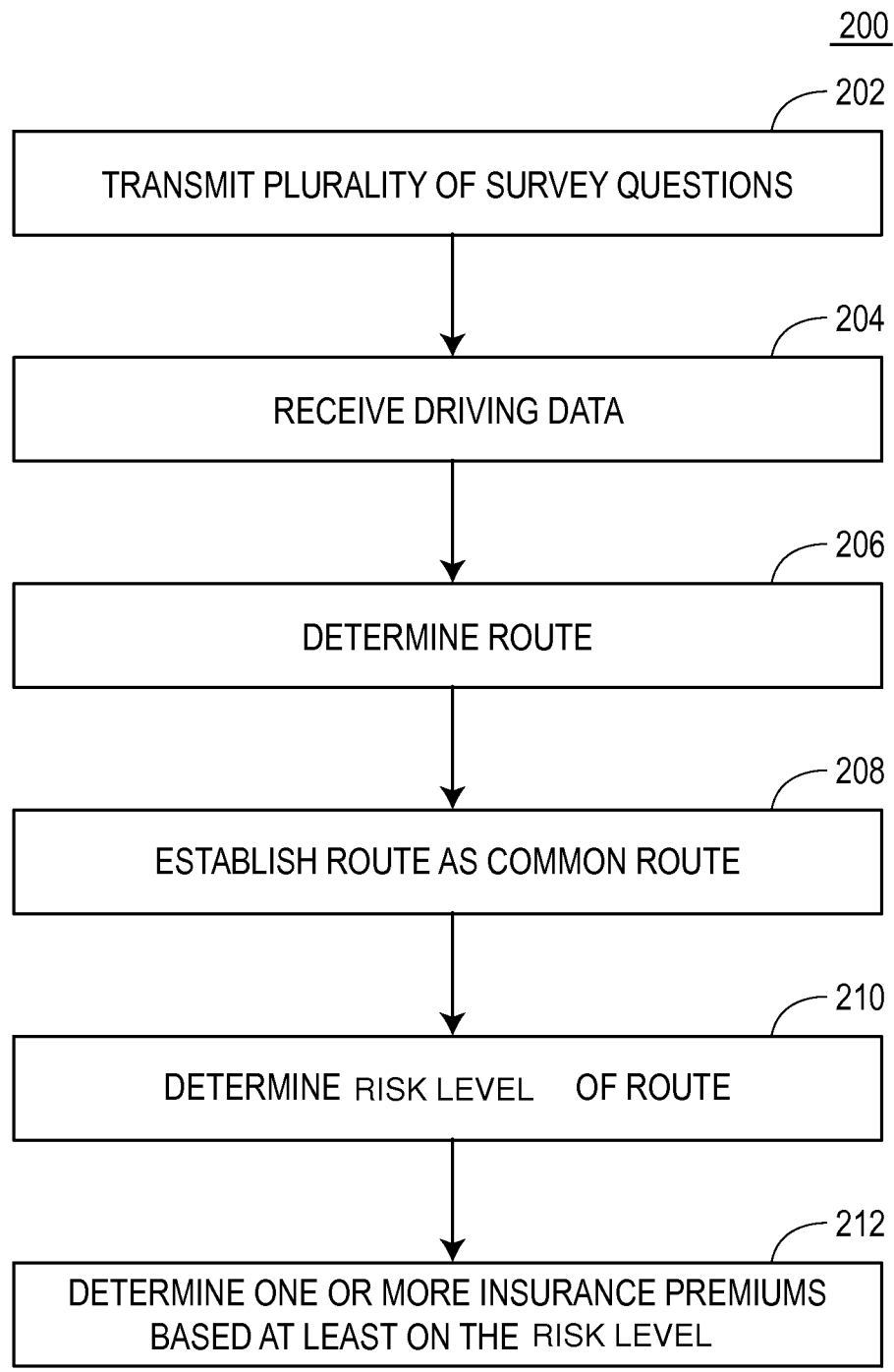
FIG. 2 is a flow diagram of an example method for establishing a common driving route to calculate an insurance quote.

Turning now to FIG. 2, a flow chart depicts an exemplary method 200 for establishing a common driving route to calculate an insurance quote. At block 202, a processor of a data server (such as the data server 126 illustrated in FIG. 1) may execute an instruction to transmit a plurality of survey questions to a client device (such as the client device 104 illustrated in FIG. 1). For example, the survey questions may be used to acquire common navigation routes, routine travel patterns, accident history, common driving routes, customer driving experience, frequency of activity, etc. The survey may, for example, include questions about age, place of residence and place of employment and routine travel (driving children to school, driving to a vacation home or rental property, driving to the airport, etc.). In some embodiments, instead of or in addition to the survey questions, additional information concerning common navigation routes and/or routine travel patterns may be retrieved from a global positioning system and/or other tracking device/sensors carried by a customer or placed in a vehicle.

At block 204, the data server may receive the driving data in response to the plurality of survey questions and at block 206 the data server may execute an instruction to determine a route from the driving data. At block 208, the processor may execute a further instruction to establish the determined route as a common route and associate the common route with a customer account. In some embodiments, the processor may also execute an instruction to create a customer account if one does not exist. Each route may include a starting point, end point, one or more points in between one or more parking or garaging locations, one or more route segments (such as highways, streets etc.) as well as one or more additional locations (such as a common stop made during the route). At block 210, the processor may also execute an instruction to determine a risk level of a route. The risk level may be a numerical value, such as a percentage, a weighted value, etc. At block 212, the processor may execute an instruction to determine one or more insurance premiums based at least in part on the risk level. In some embodiments, the processor may execute an instruction to calculate one or more price quotes and/or make one or more price quote adjustments.

Figure 3:
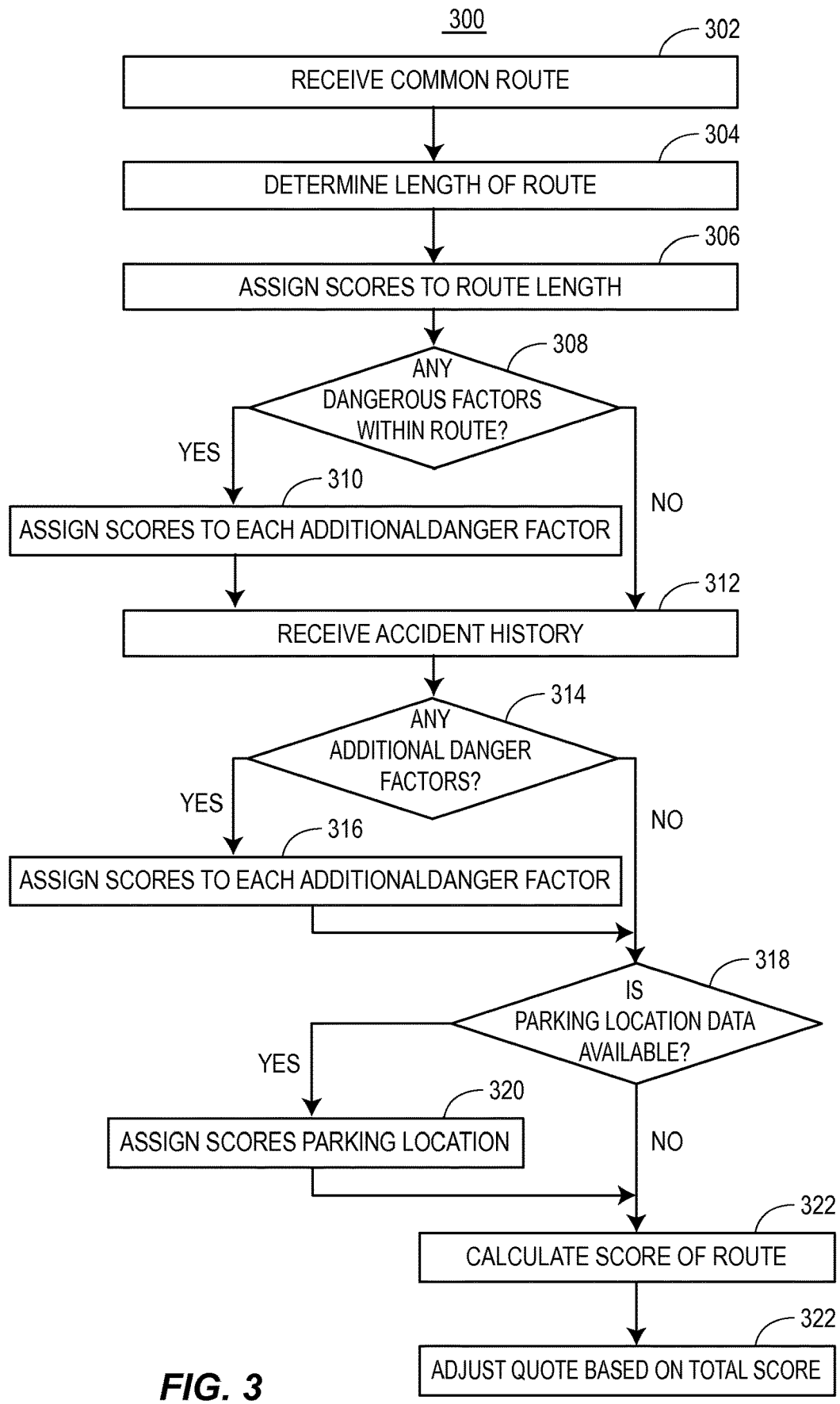
FIG. 3 is a flow diagram of an example method for determining a risk level of a route.

Turning now to FIG. 3, a flow chart depicts an exemplary method 300 for determining a risk level of a route (i.e., block 210). As discussed above in reference to FIG. 2, a data server may receive a plurality of information concerning driving routes from responses to survey data and/or data received from a vehicle and/or client device. Accordingly, the data server may execute an instruction to process the data and determine a risk level of a route.

At block 302, the processor receives a common route. In some embodiments, the common route may be determined by a processor executing the method 200 as discussed above in reference to FIG. 2. At block 304, the processor may execute an instruction to determine the length of the route and at block 306 the processor may execute an instruction to assign a risk score to the route length. For example, a longer route may have a lower risk score because there is more opportunity for accidents to happen, where the longer route also includes higher traffic rates, accident rates, or similar historical data as described at block 308, below. In some embodiments, the instruction executed by the processor may also account for how often the customer uses the common route (daily, weekly, etc.). As will be discussed below, the instruction executed by the processor may also take into consideration additional risk factors throughout the route and balance the additional risk factors with the length of the route.

At block 308, the processor may execute an instruction to determine if one or more dangerous factors exist within the common route. If the processor executing the instructions determines that one or more dangerous factors exist within the common route (YES branch of block 308), then at block 310 the processor may execute an instruction to assign a risk score to each of the dangerous factors. More specifically, the processor may access one or more public or private databases and determine if one or more known dangerous locations are within the common route. For example, dangerous factors may include an intersection or street with a high accident rate, a neighborhood with a higher than average crime rate, a more dangerous type of road (for example a highway may have more accidents than a side street), the population density of the surrounding area (city, suburban, rural, etc.). Furthermore, the dangerous factor may include the customer's experience driving in certain conditions. For example, a driver may move to a new urban neighborhood and have a common route that includes driving in an urban environment, but does not have significant experience in an urban driving environment. In some embodiments, the processor may also execute an instruction to take both travel patterns and the overall risk of the common route into consideration and may consider the entire route including start/end points and one or more points in between. For example, a route taken from the suburbs to a city may be riskier than a route taken from one part of the city to another part of the city. If the processor executing the instructions determines that no dangerous factors exist within the common route (NO branch of block 308), then the processor may move directly to block 312.

In any event, at block 312 the processor may retrieve an accident history corresponding to the vehicle, route and/or customer account and at block 314 the processor may execute an instruction to determine if any relevant danger factors exist in the accident history. For example, even if the vehicle was not involved in an accident, the accident report may indicate that a particular area of a route has a certain level of accidents. The processor may retrieve the accident history by accessing one or more public or private databases and determine if one or more known dangerous locations are within the common route. If the processor executing an instruction determines that one or more relevant danger factors exist in the accident history (YES branch of block 314), at block 316, the processor may execute an instruction to assign a risk score to each danger factor in the accident history. If the processor executing the instruction determines that no danger factors exist in the accident history (NO branch of block 314), then the processor may move directly to block 318.

At block 318, the processor may determine one or more parking locations corresponding to the start point and/or the end point or one or more points in between of the common route. In some embodiments, the response to the survey questions may indicate a parking location frequently used. In some embodiments, the processor may analyze GPS data in order to determine the one or more parking locations. For example, the customer may park in a residential garage, a commercial garage, a parking lot, street parking etc. If the processor executing the instruction determines that one or more parking locations exist in the common route (YES branch of block 318), at block 320, the processor may execute an instruction to assign a risk score to each parking location. For example, a parking location of a residential garage may be considered safer than a commercial garage, which may in turn be considered safer than street parking. If the processor executing the instruction determines that no parking locations exist in the common route (NO branch of block 318), then the processor may move directly to block 322.

Figure 4A:
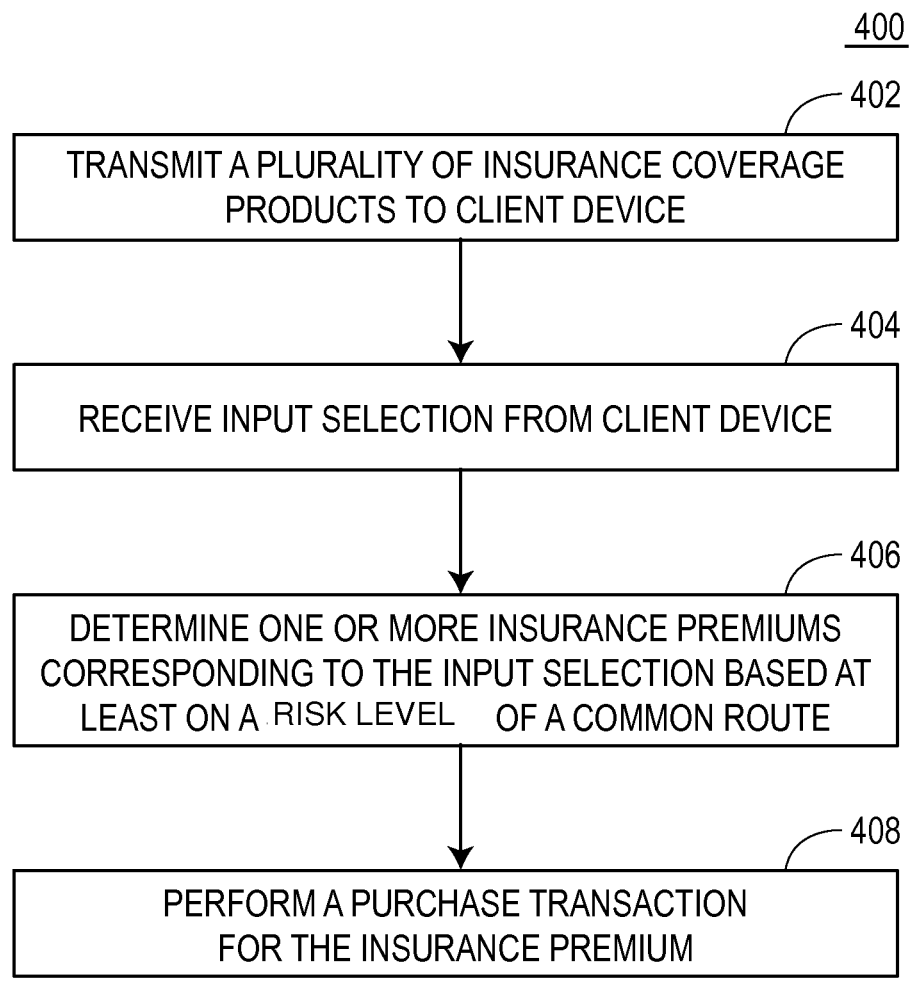
FIG. 4A is a flow diagram of an example method for performing a purchase transaction for an insurance product.
Figure 4B:
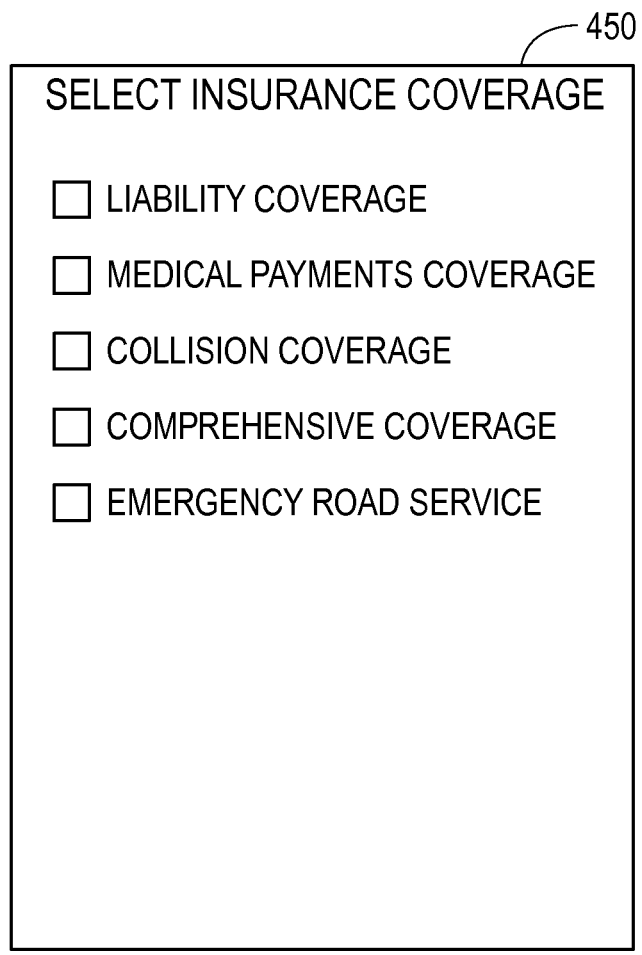
FIG. 4B is a diagram illustrating an example viewport of a client device displaying a plurality of insurance coverage products.

In some embodiments, the processor may also execute an instruction to determine if any other risk factors are present and execute an instruction to assign a risk score to the one or more other risk factors. For example, other risk factors may include sensor data received from the vehicle such as a check engine light being active, current weather patterns, etc. Other risk factors may also include, a traversed intersection, a road type, a road hilliness, a road curviness, a road shoulder access, a number of stoplights, a number of stop signs, a roadside hazard and wherein at least one of the risk factors corresponds to at least one of the start point, the end point or one or more points in between the start point and the end point of the common driving route At block 322, the processor may execute an instruction to calculate the total score for the common route. In some embodiments the total score may include scores for the length of the common route, frequency of use of the common route, one or more dangerous factors within the common route, accident history and parking locations, etc. At block 324 the processor may execute an instruction to adjust a price quote based on the total score. In some embodiments, the processor may first calculate a price quote and then adjust the price quote. The processor may also execute an instruction to process one or more insurance options, including pricing and underwriting, based at least in part on the risk level of the common driving route Referring now to FIG. 4A, a flow chart depicts an exemplary method 400 for performing a purchase transaction for an insurance product. As previously discussed in reference to the method 200 and method 300, information relating to a common route of a customer may be used to determine a risk level of a route and be used to adjust a price quote associated with the customer/vehicle. The method 400 may be used to present a price quote for an insurance product to a customer and perform a purchase transaction for the insurance product.

At block 402 a processor of a data server, (such as the data server 126 described in reference to FIG. 1), may execute an instruction to transmit a plurality of insurance coverage products to a client device. After transmitting the plurality of insurance coverage products to the client device, a processor of the client device may display the plurality of insurance coverage products within a viewport of the client device. For example, turning briefly to the client device 450 illustrated in FIG. 4A, the insurance products may include different coverage types associated with vehicle insurance, such as liability coverage, medical payments coverage, collision coverage, comprehensive coverage and emergency road service. Of course, these are only example insurance products and those skilled in the art will recognize that other types of insurance products may be transmitted to the client device during operation of the method 400.

A user may make an input selection of an insurance coverage product and a processor of the client device may receive the input selection and transmit the input selection to the data server. At block 404 the processor may receive an input selection of an insurance product from the client device in response to the transmission. At block 406, the processor may execute an instruction to determine one or more insurance premiums corresponding to the received input selection based at least in part on the risk level of a route. For example, the processor may execute an instruction incorporating one or more steps from the method 300 in determining the one or more insurance premiums. The processor may also execute an instruction to transmit the one or more insurance premiums to the client device. At block 408, the processor may further execute an instruction to perform a purchase transaction for the insurance product.

Figure 5:
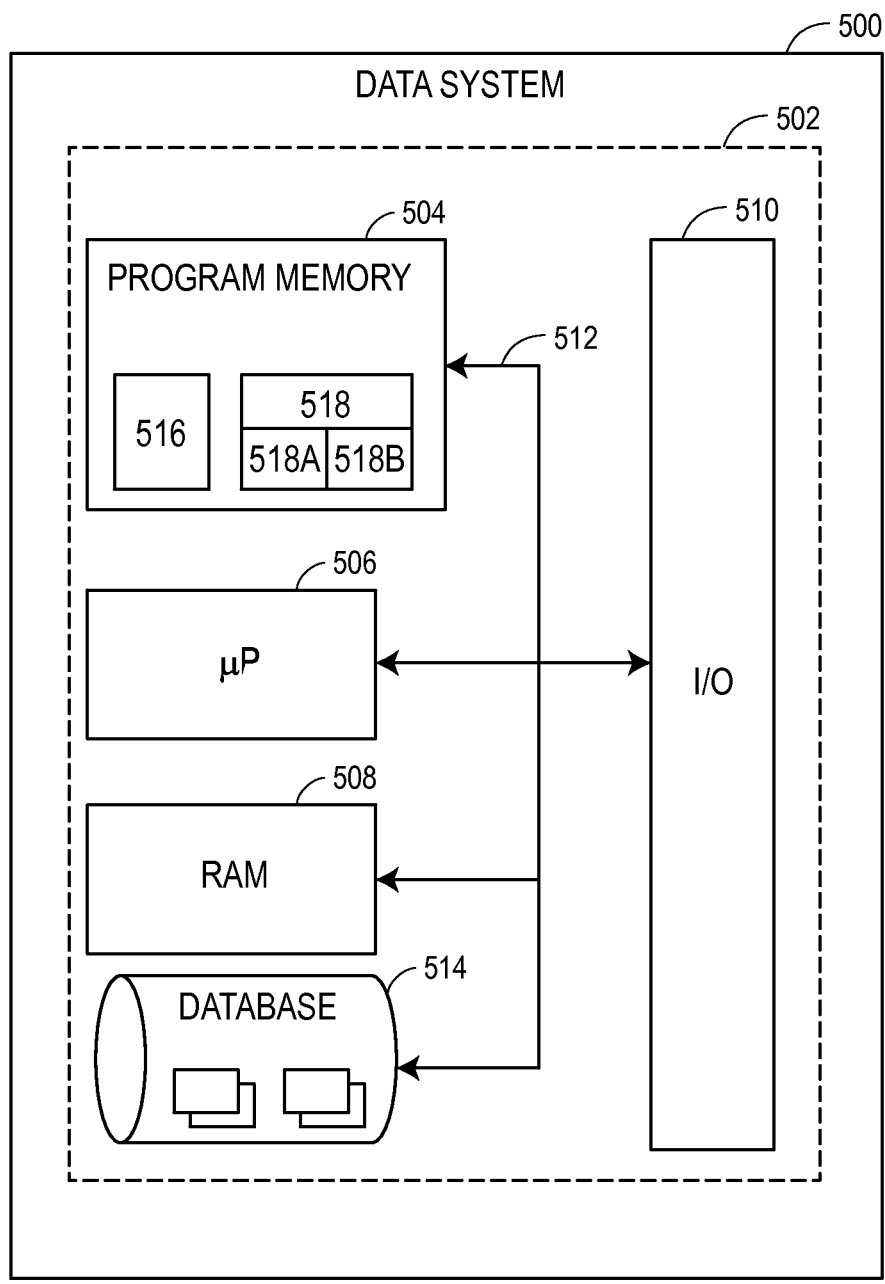
FIG. 5 is an exemplary architecture of a data system of a system and method for orienting telematics data.

Referring now to FIG. 5, a data system 500 includes a controller 502. Exemplary data systems include the vehicle 102, the client device 104 and the data server 118 as illustrated in FIG. 1. The controller 502 includes a program memory 504, a microcontroller or a microprocessor (μP) 506, a random-access memory (RAM) 508, and an input/output (I/O) circuit 510, all of which are interconnected via an address/data bus 512. The program memory 504 may store computer-executable instructions, which may be executed by the microprocessor 506. In some embodiments, the controller 502 may also include, or otherwise be communicatively connected to, a database 514 or other data storage mechanism (e.g., one or more hard disk drives, optical storage drives, solid state storage devices, etc.). It should be appreciated that although FIG. 5 depicts only one microprocessor 506, the controller 502 may include multiple microprocessors 506. Similarly, the memory 504 of the controller 502 may include multiple RAMs 516 and multiple program memories 518, 518A and 518B storing one or more corresponding server application modules, according to the controller's particular configuration.

Although FIG. 5 depicts the I/O circuit 510 as a single block, the I/O circuit 510 may include a number of different types of I/O circuits (not depicted), including but not limited to, additional load balancing equipment, firewalls, etc. The RAM(s) 516, 508 and the program memories 518, 518A and 518B may be implemented in a known form of computer storage media, including but not limited to, semiconductor memories, magnetically readable memories, and/or optically readable memories, for example, but does not include transitory media such as carrier waves.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for viewport-based contrast adjustment for adjusting insurance policies based on common driving routes and other risk factors. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A vehicle sensor based vehicular routing system for generating multi-point, user-specific risk-based vehicular routes based on vehicular sensor data received during operation of a vehicle, the vehicle sensor based vehicular routing system comprising:

a server including one or more processors communicatively and remotely coupled, via a communications network, to one or more vehicle sensors onboard a vehicle, the one or more vehicle sensors configured to generate vehicle sensor data during operation of the vehicle as the vehicle navigates a plurality of driving routes;

a computer memory communicatively coupled to the server, the computer memory configured to receive the vehicle sensor data during the operation of the vehicle, the vehicle sensor data comprising: (1) a set of points for each of the plurality of driving routes, wherein each point in the set of points defines a geographic location of the vehicle; and (2) a first set of risk factors defining one or more vehicle risks determined from the one or more sensors onboard the vehicle; and a vehicle account of a user, the vehicle account implemented on the computer memory, wherein the server is configured to:

(a) associate, within the computer memory, the vehicle sensor data with the vehicle account of the user, (b) analyze the vehicle sensor data within the computer memory, the one or more processors configured to analyze each of the set of points of each of the plurality of driving routes, as driven by the user, (c) determine, based on the vehicle sensor data, a common driving route of the user having a more frequent set of points of the set of points compared with of each of the plurality of driving routes, (d) associate, within the computer memory, one or more points of the common set of points with the first set of risk factors, wherein at least one risk factor of the first set of risk factors corresponds to at least one point of the common set of points, (e) access a risk database to retrieve a second set of risk factors that correspond to the common set of points of the common driving route, wherein at least one risk factor of the second set of risk factors defines a parking risk factor of a parking location, (f) associate, within the computer memory, one or more points of the common set of points with the second set of risk factors, wherein at least the parking risk factor of the second set of risk factors corresponds to at least one point in the common set of points, (g) access a risk database to retrieve a third set of risk factors that correspond to the common set of points of the common driving route, wherein at least one risk factor of the third set of risk factors defines a dangerous factor for the driving experience of the user experience driving in an urban environment, (h) associate, within the computer memory, one or more points of the common set of points with the third set of risk factors, wherein at least the dangerous factor of the third set of risk factors corresponds to at least one point in the common set of points, and (i) determine, via the one or more processors, a common route risk score based on each of the first set of risk factors, the second set of risk factors, and the third set of risk factors of the common driving route, (j) determine, via the one or more processors, the common route risk score of the common driving route based on each of the first set of risk factors, the second set of risk factors, and the third set of risk factors of the common driving route, wherein the common route risk score is a score for the common route and comprises a risk level specific to the common route, (k) associate the vehicle account of the user with the common driving route, (l) generate a plurality of insurance options specific to the risk level of the common route including the driving experience of the user and the common route of the user, and (m) transmit the plurality of insurance options for display and selection on a viewport of a client device of the user, wherein the viewport is configured to receive viewport-based contrast adjustments for adjusting one or more of the plurality of insurance options based on the common driving routes and driving experience of the user and the risk factors of the common route of the user.

2. The vehicle sensor based vehicular routing system of claim 1, wherein the one or more vehicle risks includes an activated vehicle indicator onboard the vehicle.

3. The vehicle sensor based vehicular routing system of claim 2, wherein the activated vehicle indicator is a check engine light.

4. The vehicle sensor based vehicular routing system of claim 1, wherein an additional risk factor of the second set of risk factors is selected from the group consisting of:

a traversed intersection;

a road type; a road hilliness;

a road curviness; a road shoulder access;

a number of stoplights; a number of stop signs; and a roadside hazard.

5. The vehicle sensor based vehicular routing system of claim 1, wherein the common route risk score comprises scores for the length of the common route and frequency of use of the common route.

6. The vehicle sensor based vehicular routing system of claim 1, wherein the server is further configured to determine a price quote based on the common route risk score.

* * * * *